United States Patent
Wang et al.

(10) Patent No.: US 8,368,005 B2
(45) Date of Patent: Feb. 5, 2013

(54) OPTICAL DETECTION METHOD AND OPTICAL MEMS DETECTOR, AND METHOD FOR MAKING MEMS DETECTOR

(75) Inventors: Chuan-Wei Wang, Hsin-Chu (TW); Hsin-Hui Hsu, Hsin-Chu (TW); Chih-Hung Lu, Hsin-Chu (TW)

(73) Assignee: Pixart Imaging Incorporation, Hsin-Chu (TW)

( * ) Notice: Subject to any disclaimer, the term of this patent is extended or adjusted under 35 U.S.C. 154(b) by 597 days.

(21) Appl. No.: 12/627,374

(22) Filed: Nov. 30, 2009

(65) Prior Publication Data

US 2011/0126623 A1   Jun. 2, 2011

(51) Int. Cl.
*G01D 5/34* (2006.01)
*G01B 11/14* (2006.01)
(52) U.S. Cl. ............... 250/231.13; 250/229; 356/614
(58) Field of Classification Search ............. 250/216, 250/231.13–231.18, 208.1, 221, 237 R, 237 G, 250/229; 356/614–617
See application file for complete search history.

(56) References Cited

U.S. PATENT DOCUMENTS

| | | | |
|---|---|---|---|
| 5,126,736 A * | 6/1992 | Okutani | 341/13 |
| 6,546,798 B1 | 4/2003 | Waters et al. | |
| 6,581,465 B1 | 6/2003 | Waters et al. | |
| 6,763,718 B1 | 7/2004 | Waters et al. | |
| 6,998,204 B2 * | 2/2006 | Furukawa et al. | 430/5 |
| 7,034,393 B2 * | 4/2006 | Alie et al. | 257/704 |

* cited by examiner

*Primary Examiner* — Georgia Y Epps
*Assistant Examiner* — Don Williams
(74) *Attorney, Agent, or Firm* — Tung & Associates

(57) ABSTRACT

The present invention discloses an optical MEMS detector, comprising: a substrate; at least one photo diode in a region within the substrate; an isolation wall above the substrate and surrounding the photo diode region; and at least one movable part having an opening for light to pass through and reach the photo diode, wherein when the at least one movable part is moved, an amount of light reaching the photo diode is changed.

20 Claims, 6 Drawing Sheets

OPTICAL DETECTION METHOD AND OPTICAL MEMS DETECTOR, AND METHOD FOR MAKING MEMS DETECTOR

BACKGROUND OF THE INVENTION

1. Field of Invention

The present invention relates to an optical detection method and an optical Micro-Electro-Mechanical System (MEMS) detector; particularly, it relates to a MEMS device in which capacitance detection is replaced by optical detection. Such MEMS device can be employed to form, for example, an accelerometer. The present invention also relates to a method for making the optical MEMS detector.

2. Description of Related Art

Present MEMS accelerometers detect displacement usually by measuring capacitance variations. As shown in FIG. 1, a capacitance-type accelerometer typically includes a fixed electrode 1 and a movable electrode 2; when the movable electrode 2 is moved, the capacitance-type accelerometer detects the capacitance variation between the electrodes 1 and 2 to determine acceleration. The structure shown in FIG. 1 can be either a top view (detecting the capacitance variation in horizontal direction) or a cross-section view (detecting the capacitance variation in vertical direction).

U.S. Pat. No. 6,763,718 discloses another type of prior art: an optical-type accelerometer as shown in FIG. 2, wherein light is reflected back and forth between two mirrors 3 and 4 to create a Fabry-Perot resonance such that only light with specific wavelengths can get to a photo diode 5. However, the structure of this optical accelerometer is very complicated. In order to achieve the Fabry-Perot resonance, the distance between the two mirrors 3 and 4 needs to be very precise; to this end, this prior art needs to provide an adjustment mechanism. Furthermore, two mirrors 3 and 4 need to be form respectively on the surfaces of the membrane 6 and the substrate 7, and the mirrors must be capable of causing partial transmission and partial reflection. Hence, the foregoing optical accelerometer requires a very complicated fabrication process, with high cost.

In view of the above, the present invention provides an optical MEMS detector to solve the foregoing problems in the prior art.

SUMMARY OF THE INVENTION

A first objective of the present invention is to provide an optical MEMS detector.

A second objective of the present invention is to provide a method for making the optical MEMS detector.

A third objective is to provide an optical detection method.

In order to achieve the foregoing and other objectives, in one perspective of the present invention, it provides an optical MEMS detector, comprising: a substrate; at least one photo diode in a region within the substrate; an isolation wall above the substrate and surrounding the photo diode region; and at least one movable part having an opening for light to pass through and reach the photo diode, wherein when the at least one movable part is moved, an amount of light reaching the photo diode is changed.

The foregoing optical MEMS detector can further comprise a light source and an optical device for guiding the light to enter the at least one opening of the movable part.

In another perspective of the present invention, it provides a method for making an optical MEMS detector, comprising the following steps: providing a substrate; forming at least one photo diode in a region within the substrate; forming an isolation wall above the substrate, the isolation wall surrounding the photo diode region; and forming at least one movable part above the photo diode, the at least one movable part having an opening for light to pass through and reach the photo diode, wherein when the at least one movable part is moved, an amount of light reaching the photo diode is changed.

In the foregoing method, in one embodiment, a light-transmissible layer can be provided above the substrate, and the light-transmissible layer can have a light passage therein. The thickness of the light-transmissible layer can be controlled by several ways. In one embodiment, the light-transmissible layer can be etched for a predetermined period of time. In another embodiment, a first light-transmissible layer, an etch stop layer, and a second light-transmissible layer are provided above the photo diode; next, the second light-transmissible layer is etched till the etch stop layer is exposed; and then, the etch stop layer is etched till the first light-transmissible layer is exposed. The etch stop layer can be made of a material including amorphous silicon or silicon nitride.

In yet another perspective of the present invention, it provides an optical detection method, comprising the following steps: providing a detector including at least one photo diode and at least one movable part above the photo diode, the at least one movable part having an opening for light to pass through and reach the photo diode; changing an amount of light passing through the opening and reaching the photo diode when the at least one movable part is moved; and determining whether the detector is moved and a corresponding displacement according to a difference of the amount of the light received by the photo diode.

In the foregoing optical detection method, the amount of light received by the photo diode can be changed by vertical or horizontal displacement of the movable part.

The objectives, technical details, features, and effects of the present invention will be better understood with regard to the detailed description of the embodiments below, with reference to the drawings.

DESCRIPTION OF THE PREFERRED EMBODIMENTS

The drawings as referred to throughout the description of the present invention are for illustration only, to show the interrelationships between the process steps and between the layers, but not drawn according to actual scale.

Figure 3:
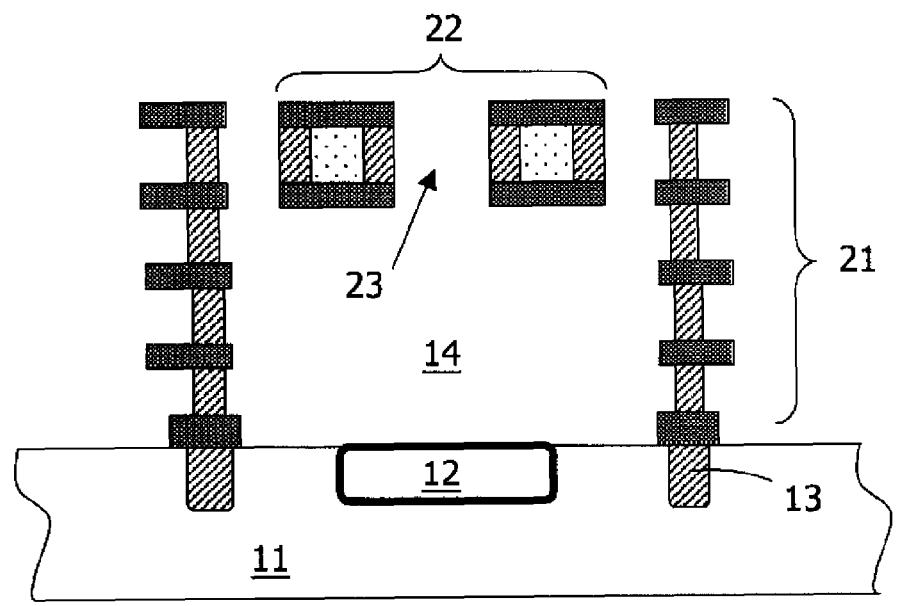
FIG. 3 illustrates one structure embodiment according to the present invention.
Figure 4:
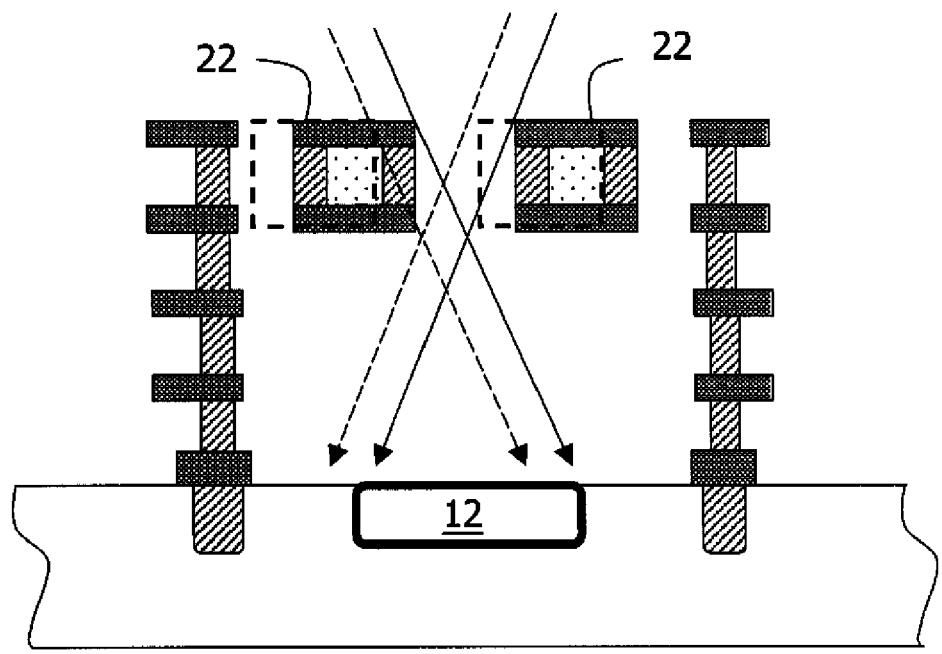
FIGS. 4-5 illustrate an optical detection method according to the present invention.
Figure 5:
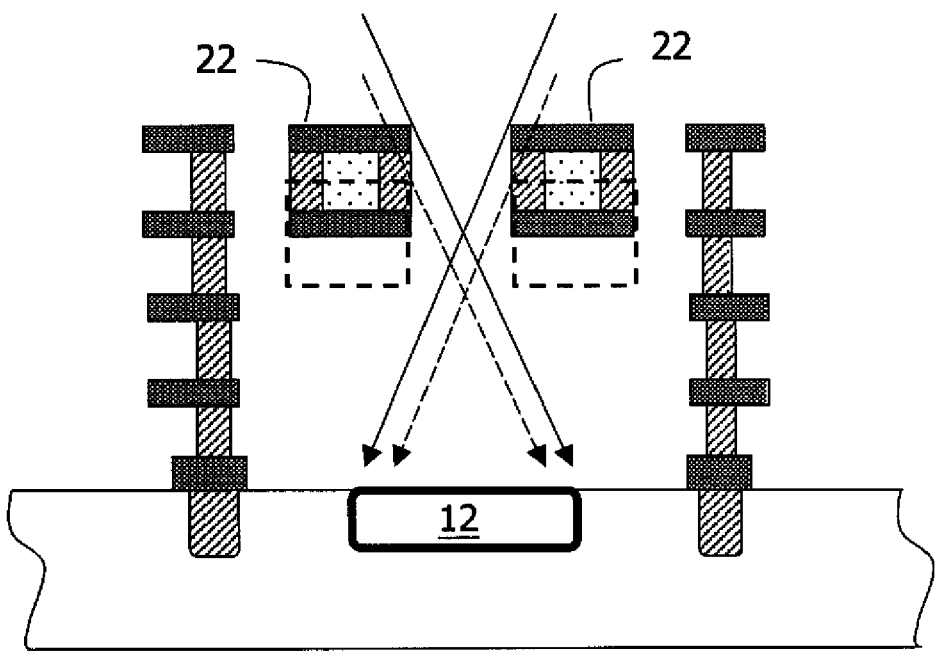

Referring to FIGS. 3-5, an optical MEMS detector and an optical detection method of the present invention are illustrated thereby. The optical MEMS detector of the present invention includes a photo diode 12 on a substrate 11 and a movable part 22 above the photo diode 12, wherein the movable part 22 can be of any shape, any structure, and any number; for example, the movable part 22 can be one single body, multiple bodies mutually connected together, or multiple bodies not totally connected together. It is only required that an opening 23 (of any shape such as a hole, a notch, etc.) is formed in the movable part 22 or in the space between multiple movable parts 22 for light to transmit through the opening 23 and reach the photo diode 12, and that the movable part 22 blocks a portion of the light above the photo diode 12 when the movable part 22 is moved, so that an amount of light which reaches the photo diode 12 is changed thereby.

When the optical MEMS detector is moved, the horizontal or vertical movement of the movable part 22 changes the amount of light received by the photo diode 12. Referring to FIG. 4, when the movable part 22 is horizontally moved, more area of the photo diode 12 is blocked thereby and the photo senses less light. Referring to FIG. 5, when the movable part 22 is vertically moved toward the photo diode 12, the amount of light received by the photo diode 12 decreases; when the movable part 22 is vertically moved away from the photo diode 12, the amount of light received by the photo diode 12 increases. Thus, whether the optical MEMS detector is moved, and a corresponding displacement of the movement, can be determined according to a difference of the amount of light received by the photo diode 12.

What FIGS. 3-5 show is only one single pixel, as an example. The optical MEMS detector of the present invention can include an array of multiple pixels, wherein the pixels are electrically isolated from one another by isolation regions 13, and each pixel is surrounded by an isolation wall 21 to block unnecessary light. Alternatively, several pixels can be arranged as one photo unit, and each unit is surrounded by one isolation wall 21, rather than one wall per pixel. The pixels are not required to have the same sizes. For example, the pixel array may be arranged in such a way that one photo unit includes a larger pixel surrounded by multiple smaller pixels, or in such a way to place larger pixels at the center of the pixel array and the smaller pixels at the periphery of the array, or some other arrangements. To protect the substrate and for better optical effect, the space 14 between the movable part 22 and the photo diode 12 can be filled in with an appropriate material and a light passage may be left in the material. In addition, an electronic device such as a transistor (not shown) can be provided next to the photo diode 12. The foregoing optical MEMS detector and optical detection method for example can be applied in an accelerometer, for detecting three-dimensional displacement of the detector and determining acceleration according to light intensity variation sensed by the entire pixel array.

Hereinafter we will describe several method embodiments for making the optical MEMS detector according to the present invention.

Figure 6:
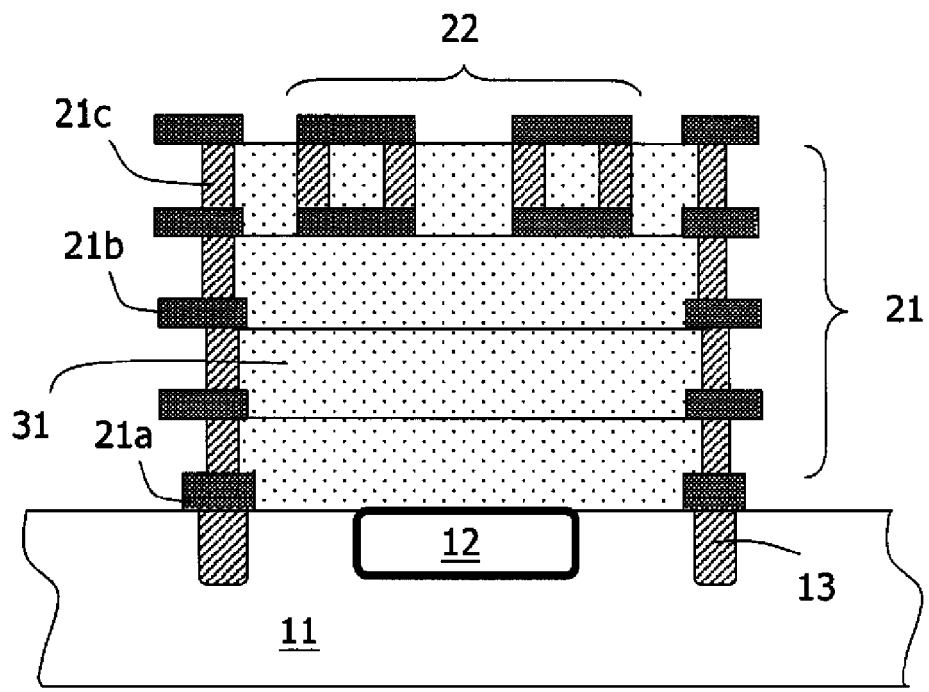
FIGS. 6-7 show an embodiment of the present invention.
Figure 7:
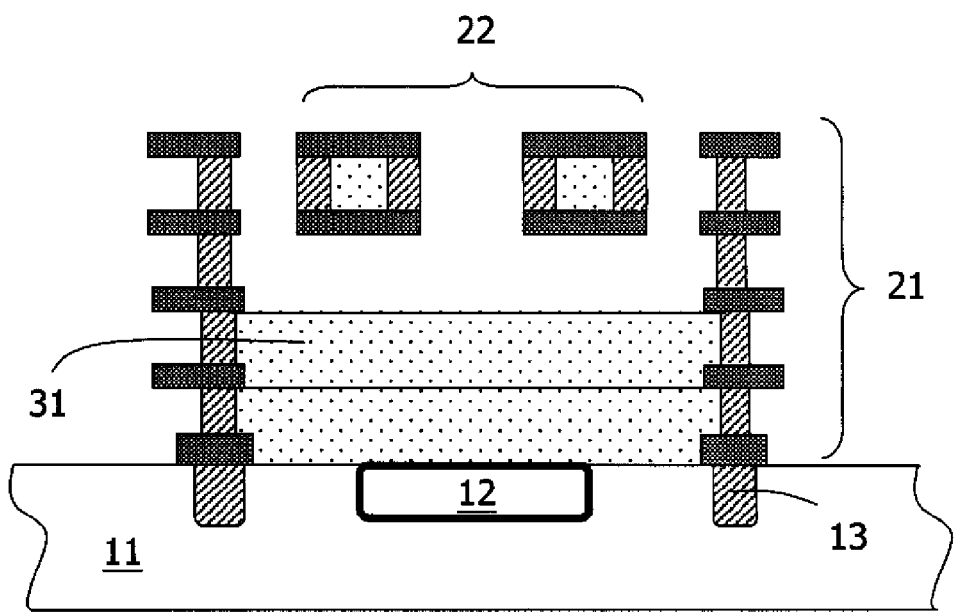

Please refer to FIGS. 6-7, which show a first embodiment of the method for making the optical MEMS detector. As shown in the drawing, a substrate 11 is provided, which for example is a silicon substrate; an isolation region 13 such as shallow trench isolation (STI) is formed in the substrate 11; a photo diode 12 is formed in the region defined by the isolation region 13, for example by ion implantation. Next, multiple non-transparent layers are deposited and patterned above the substrate 11 to form an isolation wall 21, wherein the non-transparent layer can be patterned by photolithography and etching. In one embodiment of the present invention, to be compatible with a CMOS process, the material layer 21a can be made of a material the same as the gate material of a CMOS transistor, such as polysilicon; the material layer 21b can be made of a material for forming an interconnection metal layer, such as aluminum or copper; the material layer 21c can be made of a material for forming an interconnection via layer, such as tungsten or copper. While forming the isolation wall 21, the movable part 22 and a light-transmissible layer are also formed accordingly, where the light-transmissible layer is of a material for example including oxide.

To achieve a better optical effect, the thickness of the light-transmissible layer 31 above the photo diode 12 is preferably controlled within a predetermined range. In this embodiment, as shown in FIG. 7, the light-transmissible layer 31 is etched for a predetermined period of time, such that an appropriate thickness of the light-transmissible layer 31 remains above the substrate 11. If the light-transmissible layer 31 is made of oxide, it can be etched for example by vapor hydrogen fluoride (HF). Thus, the optical MEMS detector of this embodiment is completed by the foregoing steps.

Figure 8:
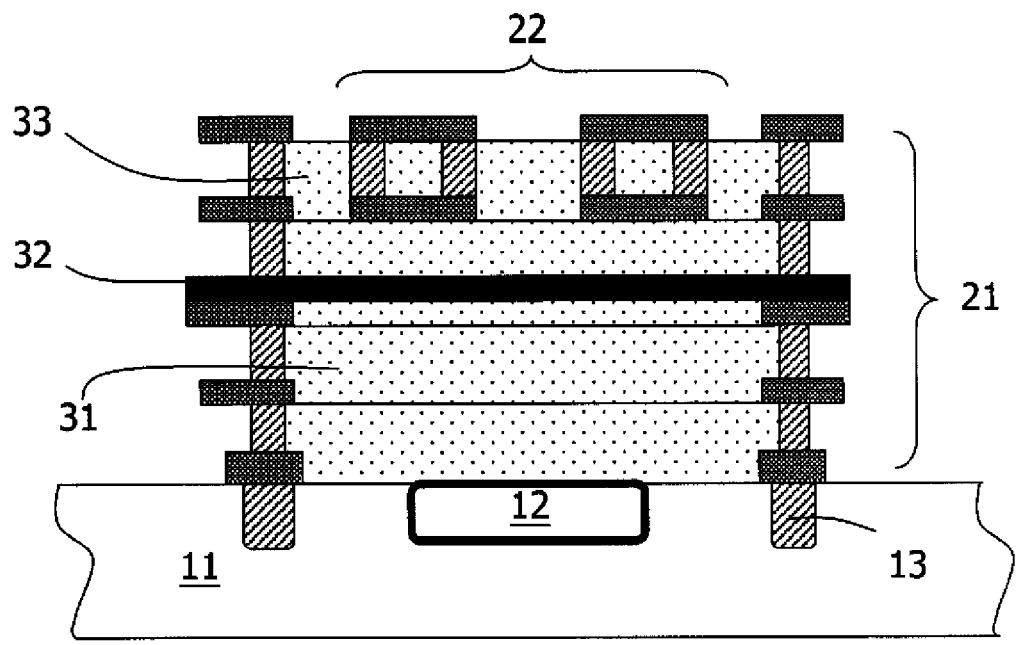
FIGS. 8-10 show another embodiment of the present invention.
Figure 9:
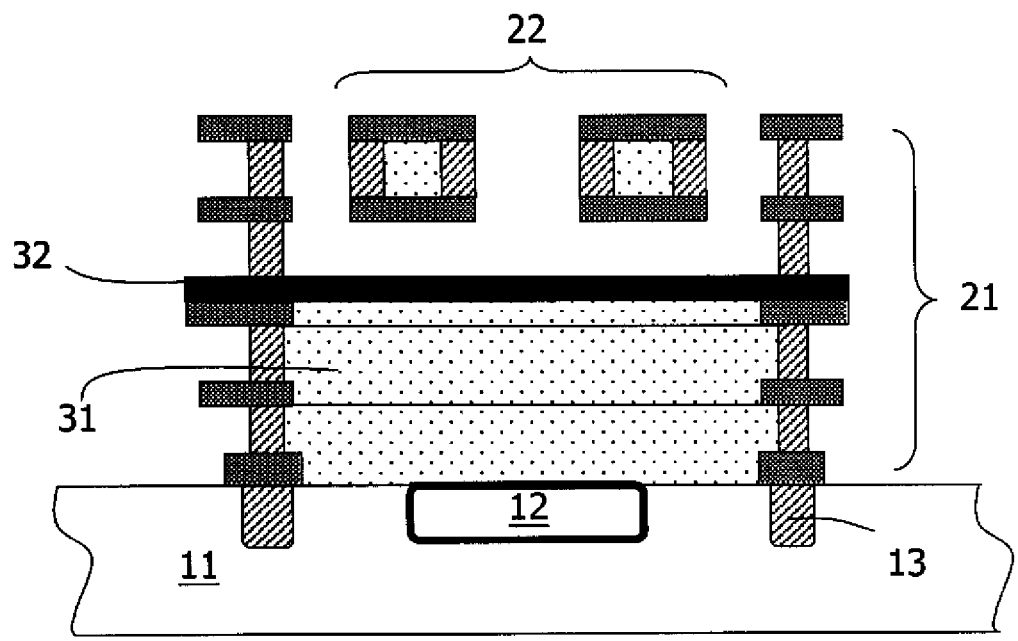
Figure 10:
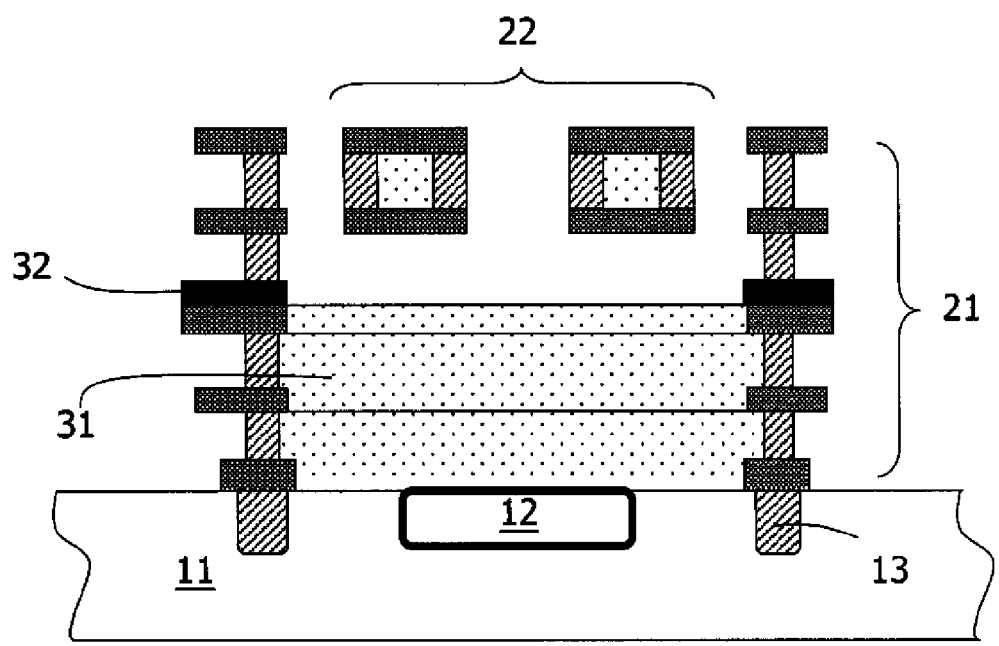
Figure 11:
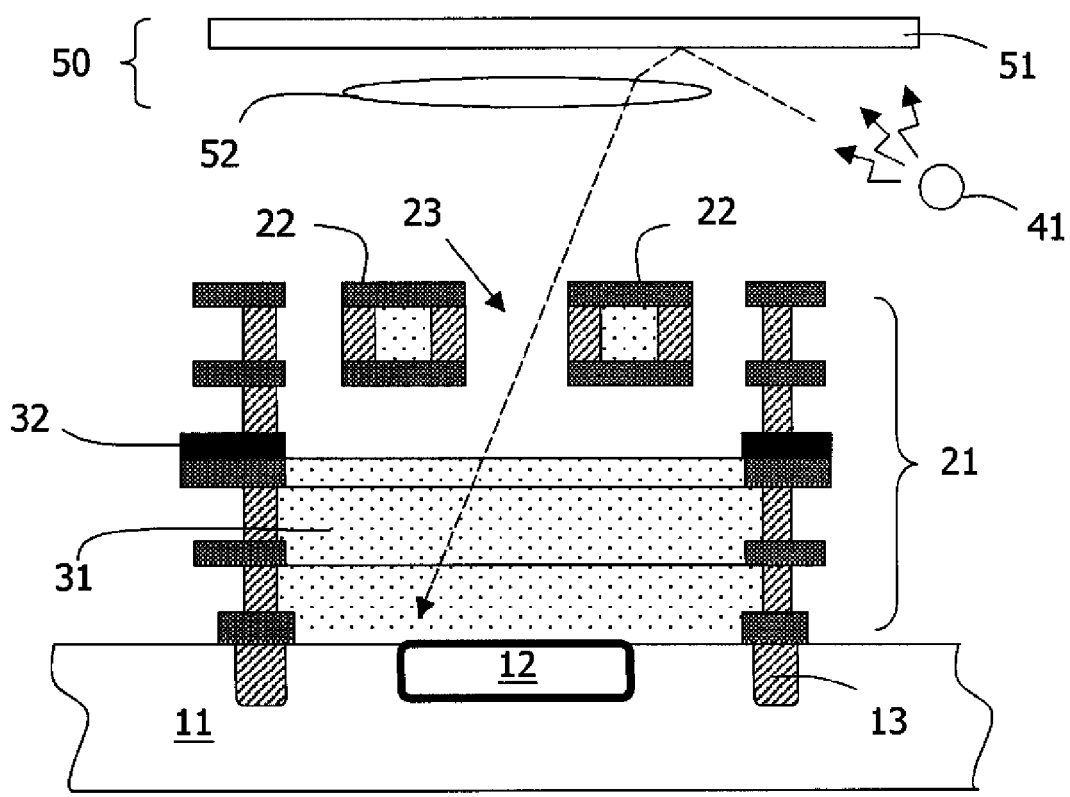
FIG. 11 shows yet another embodiment of the present invention.

Please refer to FIGS. 8-10 as another embodiment of the present invention. The steps of this embodiment which are similar to that of the previous embodiment are omitted here. As shown in FIG. 8, a first light-transmissible layer 31 made of, e.g., oxide, is deposited above the substrate 11; next, an etch stop layer 32 is deposited above the first light-transmissible layer 31; still next, a second light-transmissible layer 33 is deposited above the etch stop layer 32, the second light-transmissible layer 33 being made of oxide, for example. The etch stop layer 32 is made of a material having a high etch selectivity to the second light-transmissible layer 33, such as amorphous silicon or silicon nitride. Next referring to FIG. 9, the second light-transmissible layer 33 is etched (e.g., by vapor hydrogen fluoride (HF)) until the etch stop layer 32 is reached. Next referring to FIG. 10, the etch stop layer 32 is etched and removed to expose the first light-transmissible layer 31 below. Thus, the optical MEMS detector of this embodiment is completed.

In another embodiment of the present invention, a light source 41 can be provided inside or outside of the optical MEMS detector such that the optical MEMS detector can receive a stable light; the light source for example can be an LED. In addition, the optical MEMS detector can further include a corresponding optical device 50 to guide the light into the opening 23, wherein the optical device 50 for example can include a mirror 51 and a lens 52.

Figure 12:
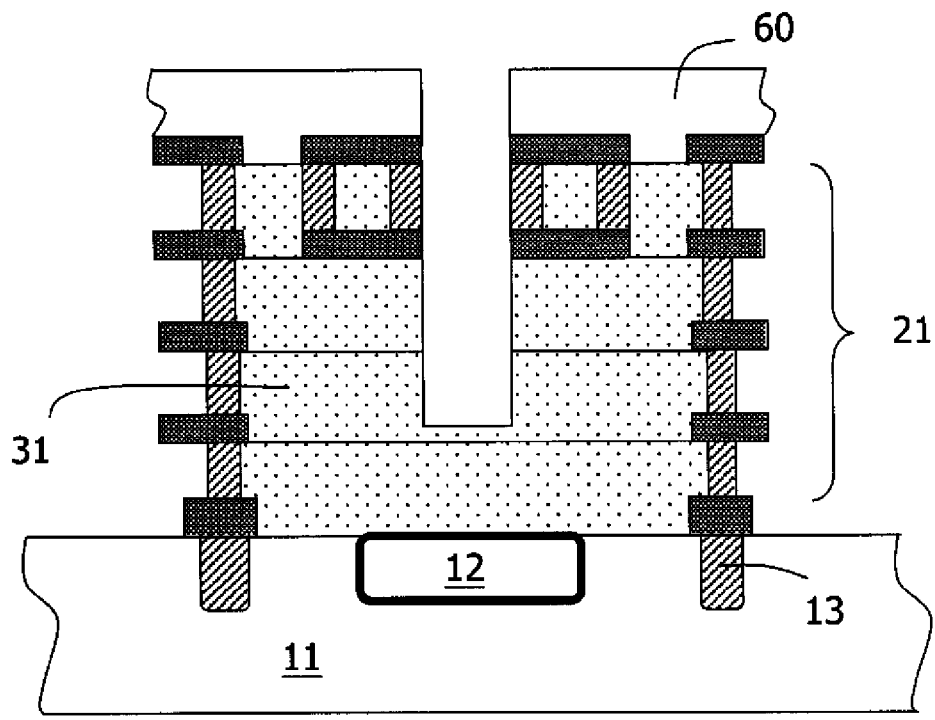
FIGS. 12-13 show a further other embodiment of the present invention.
Figure 13:
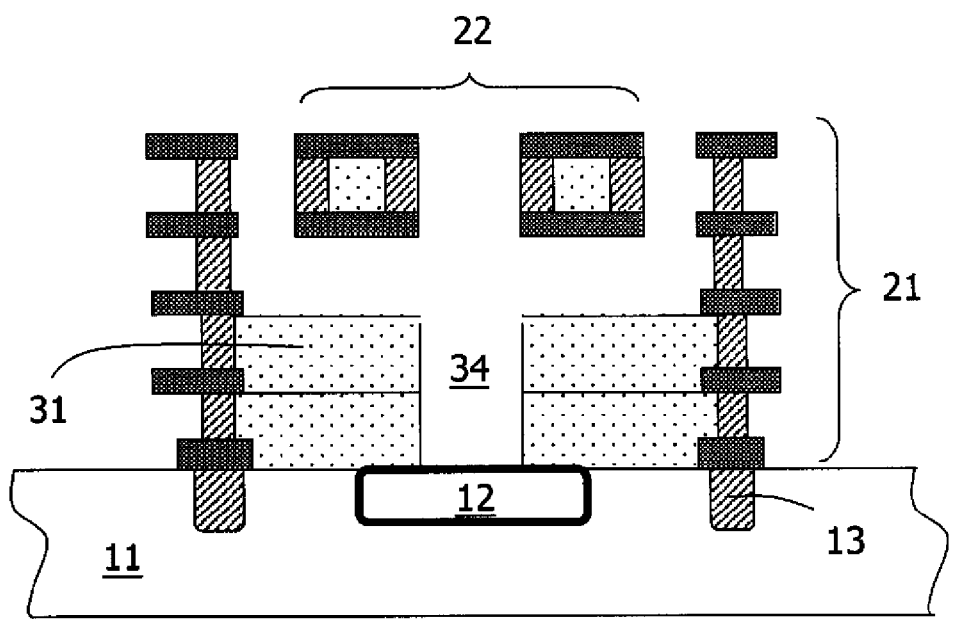

In certain applications, it may be desired to remove the first light-transmissible layer 31 exactly above the photo diode 12, so as to form a light passage to increase light transmittance. In this case, the other portion of the light-transmissible layer 31 around the light passage should preferably remain above the photo diode 12, to protect the electronic device within the pixel region (e.g., a transistor not shown). Please Refer to FIGS. 12-13, which show a process embodiment, with the structure of the first embodiment as an example. After deposition of a photoresist layer 60 and photolithography, the first light-transmissible layer 31 is etched to form the light passage 34. Note that although the light passage 34 shown in the drawing completely reaches the surface of the photo diode 12, the scope of the present invention is not limited thereto. Instead, the bottom of the light passage 34 can stop at any level within the first light-transmissible layer 31. In the second embodiment, if it is also desired to form the light passage, the steps of depositing the photoresist layer 60 and patterning the first light-transmissible layer 31 can be performed after the step shown in FIG. 10. Similarly, the light passage can be formed as well.

Figure 1:
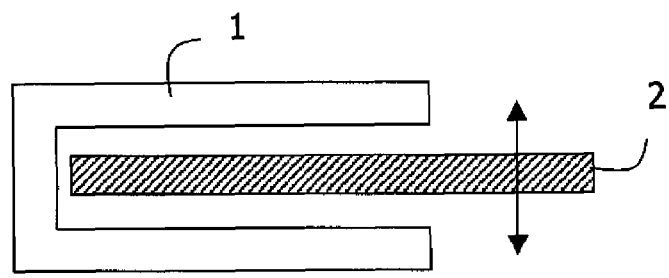
FIG. 1 illustrates a conventional capacitance-type accelerometer.
Figure 2:
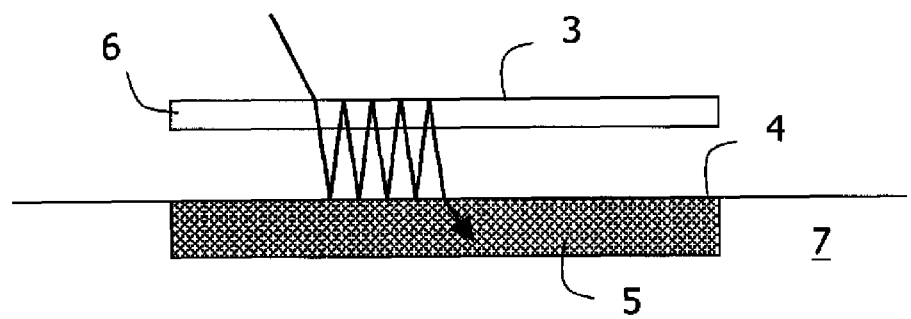
FIG. 2 illustrates an optical-type accelerometer disclosed in U.S. Pat. No. 6,763,718.

Compared with the present invention, the prior art capacitance-type MEMS detector shown in FIG. 1 is more likely to cause a stiction problem in manufacture and actual use, because the two electrodes 1 and 2 are very close to each other. Unlike the prior art capacitance-type MEMS detector, the present invention does not have such issue because the movable part 22 and the photo diode 12 are much longer in distance from each other. In addition, the structure of the present invention is capable of detecting three dimensional displacement, while the structure of the prior art capacitance-type MEMS detector shown in FIG. 1 can only detect two dimensional displacement. Compared with the prior art optical-type MEMS detector in FIG. 2, the present invention is much simpler in manufacture because it is not required to consider the Fabry-Perot resonance effect and to control the distance between the two mirrors 3 and 4 precisely.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For instance, the materials, layers of each embodiment are for illustration only and can be modified in many equivalent ways; as one example, the structure of the movable part 22 is not limited to the ones shown in the embodiments; as another example, the electronic device formed in the pixel region can be a junction transistor, and since there is no poly-silicon gate, the first light-transmissible layer 31 can be totally removed and the isolation wall 21 is not required to include the material layer 21a. In view of the foregoing, the spirit of the present invention should cover all such and other modifications and variations, which should be interpreted to fall within the scope of the following claims and their equivalents.

What is claimed is:

1. An optical MEMS detector, comprising:
   a substrate;
   at least one photo diode in a region within the substrate;
   an isolation wall above the substrate and surrounding the photo diode region; and
   at least one movable part having an opening for light to pass through and reach the photo diode,
   wherein when the optical MEMS detector is moved, the at least one movable part passively moves to generate a movement relative to the photo diode, thereby changing an amount of light reaching the photo diode such that a corresponding displacement of the optical MEMS detector is determined according to a difference of the amount of the light received by the photo diode.

2. The optical MEMS detector of claim 1, further comprising a light-transmissible layer made of a transparent material above the substrate.

3. The optical MEMS detector of claim 1, further comprising a light-transmissible layer made of a transparent material above the substrate, wherein the light-transmissible layer has a light passage over the photo diode.

4. The optical MEMS detector of claim 1, further comprising an optical device for guiding the light to enter the at least one opening of the movable part.

5. The optical MEMS detector of claim 1, further comprising a light source for providing a stable light.

6. The optical MEMS detector of claim 1, comprising multiple photo diode regions and multiple movable parts which are divided by multiple isolation walls, wherein at least one photo diode region and at least one movable part are both surrounded by at least a same one of the multiple isolation walls.

7. The optical MEMS detector of claim 6, wherein the size of at least one photo diode region is not the same as the size of another photo diode region.

8. The optical MEMS detector of claim 6, wherein at least one of the multiple isolation walls surrounds more than one photo diode regions.

9. The optical MEMS detector of claim 1, which is used for an accelerometer.

10. A method for making an optical MEMS detector, comprising the following steps:
    providing a substrate;
    forming at least one photo diode in a region within the substrate;
    forming an isolation wall above the substrate, the isolation wall surrounding the photo diode region; and
    forming at least one movable part above the photo diode, the at least one movable part having an opening for light to pass through and reach the photo diode, wherein when the optical MEMS detector is moved, the at least one movable part passively moves to generate a movement relative to the photo diode, thereby changing an amount of light reaching the photo diode such that a corresponding displacement of the optical MEMS detector is determined according to a difference of the amount of the light received by the photo diode.

11. The method of claim 10, wherein the step of forming the isolation wall includes: depositing and patterning multiple non-transparent layers to form the isolation wall, the at least one movable part being formed when forming the isolation wall.

12. The method of claim 11, further comprising: forming a light passage in the first light-transmissible layer by etching.

13. The method of claim 10, further comprising:
    depositing a first light-transmissible layer made of a transparent material above the substrate; and
    etching the first light-transmissible layer for a predetermined period of time, such that a portion of the first light-transmissible layer remains above the substrate.

14. The method of claim 13, further comprising: forming a light passage in the first light-transmissible layer by etching.

15. The method of claim 10, further comprising:
    depositing a first light-transmissible layer made of a transparent material above the substrate;
    depositing an etch stop layer above the first light-transmissible layer;
    depositing a second light-transmissible layer above the etch stop layer;
    etching the second light-transmissible layer; and
    etching the etch stop layer.

16. The method of claim 15, wherein the etch stop layer is made of a material including: amorphous silicon or silicon nitride.

17. An optical detection method, comprising the following steps:
    providing a detector including at least one photo diode and at least one movable part above the photo diode, the at least one movable part having an opening for light to pass through and reach the photo diode;
    changing an amount of light passing through the opening and reaching the photo diode when the at least one movable part passively moves to generate a movement relative to the photo diode the photo diode as the detector is moved; and determining whether the detector is moved and a corresponding displacement according to a difference of the amount of the light received by the photo diode.

18. The method of claim 17, further comprising:
providing a light source for the detector to receive a stable light.

19. The method of claim 17, further comprising:
moving the at least one movable part vertically, wherein when the at least one movable part is vertically moved toward the photo diode, it reduces the amount of the light received by the photo diode; when the at least one movable part is vertically moved away from the photo diode, it increases the amount of the light received by the photo diode.

20. The method of claim 17, further comprising:
moving the at least one movable part horizontally, wherein when the at least one movable part covers a larger area of the photo diode, it reduces the amount of the light received by the photo diode.

* * * * *